United States Patent [19]

Caceres

[11] Patent Number: 5,460,458

[45] Date of Patent: Oct. 24, 1995

[54] TOOL REACH EXTENSION APPARATUS

[75] Inventor: Peter B. Caceres, Pleasant Hill, Mo.

[73] Assignees: Robert D. Newman, Sr.; Robert D. Newman, Jr., both of Greenwood, Mo.

[21] Appl. No.: 217,603

[22] Filed: Mar. 24, 1994

[51] Int. Cl.⁶ .................... F16B 7/14; F16B 7/10
[52] U.S. Cl. .............. 403/109; 403/351; 403/377; 16/115
[58] Field of Search ............... 16/115; 403/109, 403/351, 352, 368, 374, 377; 15/144.3, 144.4

[56] References Cited

U.S. PATENT DOCUMENTS

| | | |
|---|---|---|
| 2,906,050 | 9/1959 | Foster et al. |
| 2,948,077 | 8/1960 | Karpes. |
| 2,950,558 | 8/1960 | Karpes. |
| 3,667,788 | 6/1972 | Greenwood. |
| 3,693,280 | 9/1972 | Calhoun ................... 43/17.2 |
| 3,861,071 | 1/1975 | Nordhagen. |
| 3,953,138 | 4/1976 | Hine et al. ................ 403/75 |
| 4,086,718 | 5/1978 | Swanson et al. .......... 43/17.2 |
| 4,180,346 | 12/1979 | Blake ....................... 403/109 |
| 4,294,560 | 10/1981 | Larkin ...................... 403/104 |
| 4,324,502 | 4/1982 | Pickles ..................... 403/104 |
| 4,508,467 | 4/1985 | Choffin ..................... 403/104 |
| 5,011,319 | 4/1991 | Levi et al. ................. 403/109 |
| 5,220,707 | 6/1993 | Newman, Sr. et al. ..... 16/115 |

*Primary Examiner*—S. Thomas Hughes
*Assistant Examiner*—Kenneth J. Hansen
*Attorney, Agent, or Firm*—Hovey, Williams, Timmons & Collins

[57] ABSTRACT

An apparatus for extending the reach of a tool includes a tubular receiving member and an elongated slidable member telescopically received therein. A locking assembly is provided between the members for releasably locking the slidable member in any selected axial position relative to the receiving member upon relative rotation of the members. The locking assembly includes a cam supported on the slidable member, and a shoe supported between the cam and the inner surface of the receiving member. The cam is rotatably snapped between a locked position in which the cam forces the shoe against the inner surface of the receiving member to lock the slidable member against axial movement, and an unlocked position in which the cam releases the locking force on the shoe to allow the slidable member to be extended and retracted. The snap-fit movement of the cam positively retains the cam in the locked and unlocked positions.

3 Claims, 1 Drawing Sheet

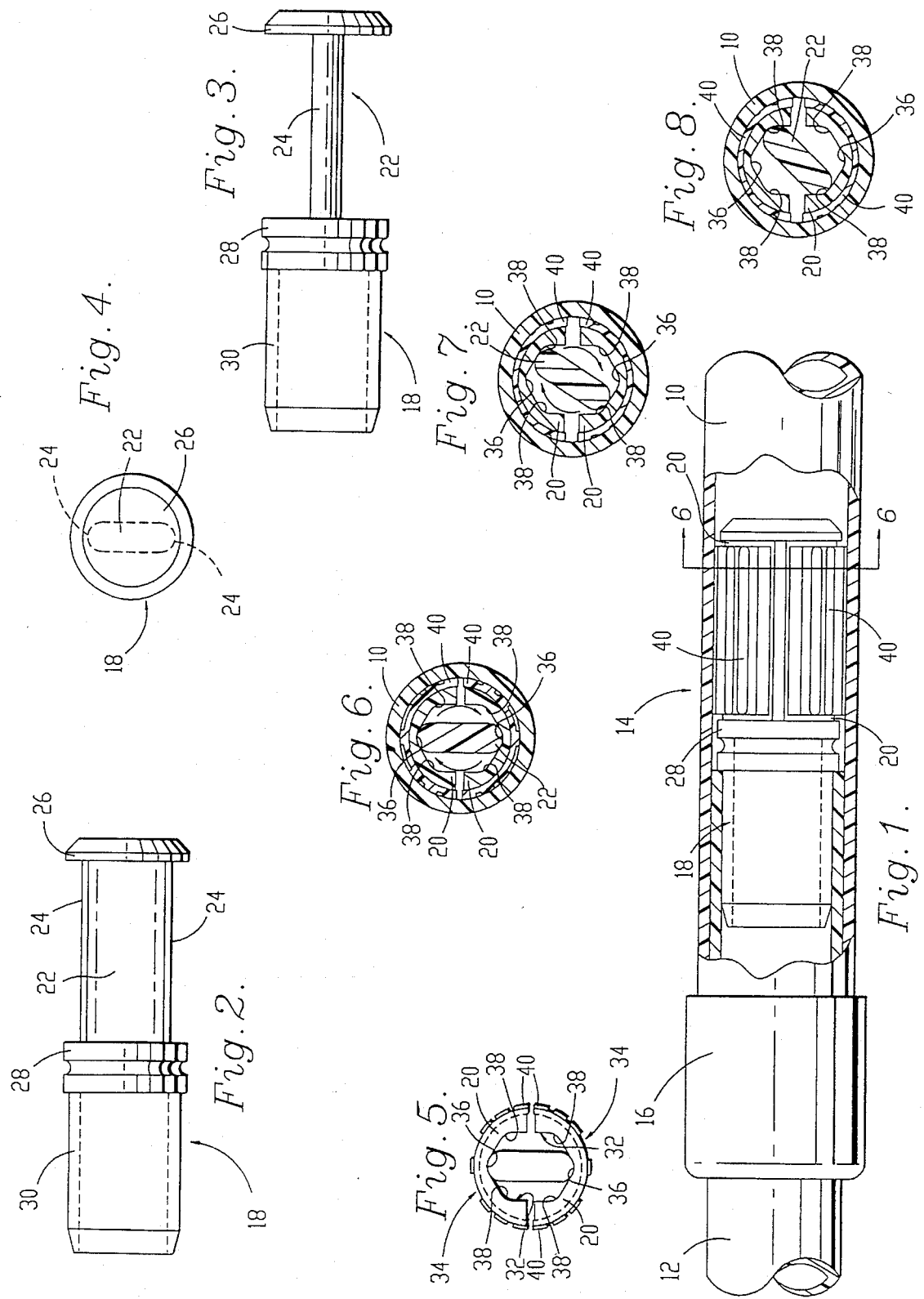

TOOL REACH EXTENSION APPARATUS

BACKGROUND OF THE INVENTION

1. Field of the Invention

The present invention relates generally to tool reach extension devices and, more particularly, to an extension apparatus having a locking assembly for releasably locking a pair of relatively shiftable members in a selected position.

2. Discussion of the Prior Art

Tool extension devices are used to extend the reach of a user for the application of a tool such as a paint roller or mop to a hard-to-reach location such as a ceiling or upper portion of a wall. Conventionally, interchangeable tool handles of various lengths are provided for extending the reach of tools by varying degrees. However, handles in each of the desired lengths must be obtained in order to provide a range of extendable coverage, and certain lengths may not be readily available to the user when needed.

An example of an adjustable tool reach extender is illustrated in U.S. Pat. No. 5,220,707, to Newman, Sr. et al., wherein a pair of telescopically coupled extension members are provided which permit adjustment in the overall length of the extender. A locking assembly is provided between the members so that once the user has extended the length of the device to a desired position, the locking assembly is moved to a locked position in which further relative movement between the members is prevented. The disclosure of U.S. Pat. No. 5,220,707 is incorporated herein by this express reference.

OBJECTS AND SUMMARY OF THE INVENTION

It is an object of the present invention to provide a tool reach extension apparatus having an improved locking assembly which is operable simply by twisting a pair of telescopically coupled extension members relative to one another to lock the members in a selected position. By achieving a locked position through relative twisting of the members, operation of the apparatus is simplified, without requiring the user to remove a hand from the device in order to operate a button or collar positioned at a particular location thereon.

It is another object of the present invention to provide a tool reach extension apparatus having a locking assembly in which the members are positively held in either the locked or unlocked position by a detent, and are moved between these positions in a snap-fit action. At the same time, the apparatus of the present invention is easy to fabricate, includes relatively few parts, is easy to use, and is very durable.

In accordance with these and other objects evident from the following description of a preferred embodiment, the present invention includes an apparatus for extending the reach of a tool, wherein the apparatus is provided with a tubular receiving member presenting an open receiving end and an inner surface, and an elongated slidable member telescopically received within the receiving member through the receiving end for allowing axial extension and retraction of the slidable member relative to the receiving member. The apparatus also includes a locking means for releasably locking the slidable member in any selected axial position relative to the receiving member upon relative rotation of the slidable member and the receiving member.

The locking means includes a cam supported on the slidable member within the receiving member, and a shoe supported between the cam and the inner surface of the receiving member and retained in axial alignment with the cam during extension and retraction of the slidable member, the shoe including an inner cam-engaging surface and an opposed outer surface. The cam is rotatable relative to the shoe between a locking position in which the cam forces the shoe against the inner surface of the receiving member to lock the slidable member against axial movement, and an unlocking position in which the cam releases the locking force on the shoe to allow the slidable member to be extended and retracted. The inner cam-engaging surface of the shoe includes a detent means for positively retaining the cam in the locked and unlocked positions and for providing a snap-fit movement between the locked and unlocked positions when the slidable member and receiving member are rotated relative to one another.

By providing a construction in accordance with the invention, numerous advantages are realized. For example, by providing a locking means in which the cam is positively retained in both the locked and unlocked positions, a user may easily determine the status of the locking means, and is assured that the extension members will remain locked in the selected position when desired.

Further, the use of such positive retention of the cam in the locked and unlocked positions provides a snap-fit movement between the positions that is easy for the user to detect and appreciate.

BRIEF DESCRIPTION OF THE DRAWING FIGURES

A preferred embodiment of the present invention is described in detail below with reference to the attached drawing figures, wherein:

FIG. 1 is a fragmentary side elevational view, partly in section, of a tool reach extension apparatus constructed in accordance with the preferred embodiment, illustrating a locking assembly of the apparatus;

FIG. 2 is a side elevational view of a cam of the locking assembly;

FIG. 3 is a top plan view of the cam;

FIG. 4 is an end elevational view of the cam;

FIG. 5 is an end elevational view of a pair of opposed shoes of the locking assembly, illustrating the unlocked orientation of the shoes relative to the cam;

FIG. 6 is a sectional view taken along line 6—6 of FIG. 1, illustrating the locking assembly in the unlocked position;

FIG. 7 is a sectional view taken along line 6—6 of FIG. 1, illustrating the locking assembly during movement between the unlocked and locked positions; and FIG. 8 is a sectional view taken along line 6—6 of FIG. 1, illustrating the locking assembly in the locked position.

DETAILED DESCRIPTION OF THE PREFERRED EMBODIMENT

A tool reach extension apparatus constructed in accordance with the preferred embodiment is illustrated in FIG. 1, and broadly includes a tubular receiving member 10, a slidable member 12 telescopically coupled with the receiving member, and a locking means 14 for releasably locking the slidable member in any selected axial position relative to the receiving member upon relative rotation of the two members.

The receiving member 10 is preferably composed of fiberglass or a combination of fiberglass and aluminum, and presents a generally circular cross-sectional shape. One axial end of the receiving member is enclosed by an end cap for preventing dirt and debris from entering the member. The opposite axial end of the member presents an open receiving end within which the slidable member 12 is accommodated.

The slidable member 12 also presents a circular cross-sectional shape, and includes an outer axial end having a threaded fitting coaxially aligned and coupled therewith as is conventional. The fitting is shown in U.S. Pat. No. 5,220, 707, and is adapted to support any one of a plurality of different tools, e.g. a paint roller or mop, so that application of the tool to a hard-to-reach location such as a ceiling or high wall is facilitated. The opposite axial end of a slidable member presents an open receiving end within which the locking means 14 is supported. As with the receiving member 10, the slidable member 12 is preferably formed of fiberglass or a combination of fiberglass and aluminum.

The receiving member 10 presents an inner surface and includes an inner diameter slightly larger than the outer diameter of the slidable member 12 so that the slidable member is telescopically received within the member for axial shiftable movement. A retention collar 16 is secured to the end of the receiving member and presents a reduced-diameter neck adjacent the open end of the member for retaining the slidable member within the receiving member, as described more fully below.

The locking means 14 generally includes a cam 18 and a pair of radially opposed shoes 20. The cam is illustrated in FIG. 2, and is preferably molded of a unitary piece of material such as acetal (an example of which is marketed under the trademark DELRIN). However, any desired material may be used. The cam 18 includes an elongated body 22 presenting two radially opposed, parallel cam surfaces 24, flanges 26, 28 at the ends of the body, and a plug 30 extending beyond the flange 28 away from the body 22.

As shown in FIG. 4, the body 22 presents an oval cross-sectional shape, with the two radially opposed, parallel cam surfaces 24 being located equidistant from the longitudinal axis defined by the body. As shown in FIG. 3, the flange 26 includes a tapered distal end for facilitating assembly of the slidable member and the receiving member. A similar tapered surface is provided on the free end of the plug 30 for guiding the plug into the open end of the slidable member 12 during assembly so that the plug may be secured within the slidable member, as shown in FIG. 1, by a suitable adhesive or the like.

The flanges 26, 28 of the cam define outer diameters which are larger than the inner diameter of the slidable member 12 and smaller than the inner diameter of the receiving member 10. The plug 30 includes an outer diameter substantially equal to the inner diameter of the slidable member. By providing this construction, the plug fits snugly within the slidable member, and the flange 28 defines a stop against which the slidable member abuts when the cam is secured to the member.

The two shoes 20 are illustrated in FIG. 5, and are substantially identical to one another in all respects. Each shoe includes a generally C-shaped cross section presenting an inner cam-engaging surface 32 and an opposed outer surface 34. As shown in FIG. 1, the shoes are elongated, having a length substantially equal to the distance between the flanges 26, 28 of the cam so that the shoes are retained between the flanges in axial alignment with the cam during extension and retraction of the slidable member.

The inner cam-engaging surface 32 of each shoe 20 includes an elongated notch 36 centrally disposed in the surface and extending along the length thereof. The notches 36 are diametrically opposed to one another when the shoes are positioned on the cam, and the radial thickness of the shoes at the elongated notches is such that when the cam surfaces are engaged with the notches, the shoes are forced against the inner surface of the receiving member with a minimal force, allowing relative telescopic movement of the members 10, 12.

The cam-engaging surface 32 of each shoe also includes a pair of second notches 38 spaced circumferentially from the first notch 36 and extending in a direction parallel thereto, with one of the second notches positioned on either side of the first notch. These second notches 38 are diametrically opposed to the second notches of the other shoe so that when the cam is rotated in either direction from the position shown in FIG. 5, the cam surfaces are brought into engagement with two of the second notches. The radial thickness of the shoes 20 is greater at the second notches 38 than at the first notches 36 so that when the cam engages the second notches, the cam forces the shoes against the inner surface of the receiving member 10 to lock the slidable member 12 against axial movement.

The radial thickness of the shoes along the circumferential regions between the first notch and each of the second notches 36, 38 and between the second notches and the edges of the cam-engaging surface is greater than the thickness of the shoe at the second notches. By providing this construction, a detent means is defined for positively retaining the cam in the locked and unlocked positions and for providing a snap-fit movement therebetween. As the cam 18 is rotated relative to the shoes 20, the cam surfaces 24 must overcome the resistance exerted on the cam due to the increased thickness of the shoes between the notches 36, 38. Thus, the cam snaps between the first and second notches as the cam surfaces ride between the notches, and is positively retained in the notch to which it is moved.

Each shoe 20 is preferably formed of a material similar to the material used to form the cam 18, and includes an outer surface adapted to support a layer of gripping material 40. The gripping material may be molded over the shoe, and is soft and resilient when compared to the material used to form the shoe. An example of a material adapted for use as the gripping material is urethane, although other soft, compressible materials having a relatively high coefficient of friction may be used. The purpose of providing this outer layer 40 of material is to increase the resistance exerted by the shoe on the inner surface of the receiving member against relative movement.

Turning to FIG. 6, the cam 18 is illustrated in the unlocked position in alignment with the first notches 36. In this position, the outer layers 40 of the shoes engage the inner surface of the receiving member 10, but not with sufficient force to lock the slidable member against axial movement. Thus, the slidable member can be adjusted to any desired axial position. As shown in FIG. 1, the outer layers 40 of the shoes 20 extend radially beyond the flanges 26, 28 of the cam and the outer diameter of the slidable member, and catch on the neck of the collar 16 if an attempt is made to remove the slidable member from the receiving member. Thus, the collar retains the slidable member 12 within the receiving member 10 and cooperates with the shoes to prevent the members from being pulled apart.

Once the desired axial position of the members 10, 12 is established, the slidable member is rotated, as shown in FIG.

7, so that the cam 18 rotates relative to the receiving member 12. Because the shoes 20 are in engagement with the inner surface of the receiving member, they remain fixed to the member as the cam rotates. Thus, the cam rides across the surfaces between the first and second notches 36, 38 into engagement with a pair of the second notches 38. This locked position of the cam is shown in FIG. 8, wherein the slidable member is prevented from axial movement relative to the receiving member.

Although the invention has been described with reference to the preferred embodiment illustrated in the attached drawing figures, it is noted that substitutions may be made and equivalents employed herein without departing from the scope of the invention as recited in the claims.

What is claimed is:

1. An apparatus for extending the reach of a tool, the apparatus comprising:

a tubular receiving member presenting an open receiving end and an inner surface;

an elongated slidable member having a first axial end that protrudes beyond the receiving member, and a second axial end telescopically received within the receiving member through the receiving end for allowing axial extension and retraction of the slidable member relative to the receiving member; and a locking means for releasably locking the slidable member in any selected axial position relative to the receiving member upon relative rotation of the slidable member and the receiving member, the locking means including a cam supported on the slidable member within the receiving member and including an elongated body having an oval cross-sectional shape presenting two radially opposed cam surfaces, and having a flange at each end of the body, and, two shoes of generally C-shaped cross section supported between the cam and the inner surface of the receiving member on opposite sides of the cam body and retained in axial alignment with the cam during extension and retraction of the slidable member, each shoe including an inner cam-engaging surface and an opposed outer surface, the cam being rotatable relative to the shoes between a locked position in which the cam forces the shoes against the inner surface of the receiving member to lock the slidable member against axial movement, and an unlocked position in which the cam releases the locking force on the shoes to allow the slidable member to be extended and retracted, the inner cam-engaging surfaces of the shoes including detent means for positively retaining the cam in the locked and unlocked positions and for providing a snap-fit movement between the locked and unlocked positions when the slidable member and receiving member are rotated relative to one another, the detent means of each shoe including a first elongated notch and a pair of second elongated notches extending in a direction parallel to a length of the cam surfaces, the first notch of each shoe defining the unlocked position and the second notches defining the locked position, each of the shoes having a radial thickness that is greater at each of the second notches than at the first notch so that when the cam engages one of the second notches of each shoe, the shoes are forced against the inner surface of the receiving member to lock the slidable member against axial movement, the second notches on each shoe being spaced circumferentially on opposite sides of the first notch so that the cam may be rotated in either direction from the unlocked position to the locked position, the radial thickness of each shoe being greater along the circumference between the first notch and each of the second notches than at the first and second notches so that the cam snaps between the first and second notches during relative rotational movement of the receiving member and slidable member.

2. An apparatus as recited in claim 1, wherein the cam includes a plug extending beyond one of the flanges away from the body, and the second axial end of the slidable member is open and receives the plug to support the cam on the slidable member.

3. An apparatus as recited in claim 1, wherein the inner cam-engaging surface of each shoe is formed of a different material than the opposed outer surface, the material of the outer surface being relatively soft and resilient, presenting a relatively high coefficient of friction for increasing the resistance against axial movement of the slidable member when the cam is in the locked position.

* * * * *